(12) United States Patent
Kodama et al.

(10) Patent No.: US 8,780,393 B2
(45) Date of Patent: Jul. 15, 2014

(54) PRINT CONTROL APPARATUS AND CONTROL METHOD THEREFOR

(75) Inventors: Yoichi Kodama, Yokohama (JP); Yoichi Matsuyama, Yokohama (JP); Yuji Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 13/311,530

(22) Filed: Dec. 5, 2011

(65) Prior Publication Data

US 2012/0162705 A1    Jun. 28, 2012

(30) Foreign Application Priority Data

Dec. 24, 2010  (JP) .................................. 2010-288555
Oct. 20, 2011  (JP) .................................. 2011-231100

(51) Int. Cl.
*G06F 3/12* (2006.01)
*G06K 15/00* (2006.01)

(52) U.S. Cl.
USPC .......................... 358/1.15; 358/1.13; 358/1.16

(58) Field of Classification Search
None
See application file for complete search history.

(56) References Cited

U.S. PATENT DOCUMENTS

| | | | |
|---|---|---|---|
| 7,631,258 B2 | 12/2009 | Kayama | |
| 8,300,238 B2 | 10/2012 | Kato | |
| 2006/0026121 A1 | 2/2006 | Terao | |
| 2006/0176498 A1 | 8/2006 | Wada et al. | |
| 2008/0165383 A1* | 7/2008 | Myoki | 358/1.15 |
| 2012/0182580 A1* | 7/2012 | Yamashita et al. | 358/1.16 |

FOREIGN PATENT DOCUMENTS

| | | |
|---|---|---|
| CN | 1845060 A | 10/2006 |
| CN | 101652745 A | 2/2010 |
| JP | 2006-40060 A | 2/2006 |
| JP | 2006-222661 A | 8/2006 |
| JP | 2009-104302 A | 5/2009 |
| JP | 2010-257157 A | 11/2010 |

OTHER PUBLICATIONS

U.S. Appl. No. 13/323,476, filed Dec. 12, 2011. Applicants: Shogo Hagiwara, et al.
U.S. Appl. No. 13/333,750, filed Dec. 21, 2011. Applicants: Hiroshi Yamashita, et al.

* cited by examiner

*Primary Examiner* — Dov Popovici
(74) *Attorney, Agent, or Firm* — Fitzpatrick, Cella, Harper & Scinto (57) ABSTRACT

In a print control apparatus which causes a print apparatus to print via a hot folder, it is monitored whether a file is submitted to the hot folder. Upon submitting the file, it is identified whether the submitted file is a reference information file indicating an external content file, and, upon identifying the reference information file, it is determined whether an acquisition process of acquiring the external content file indicated by the reference information file is to be executed by the print control apparatus or the print apparatus. Upon determining that the acquisition process is to be executed by the print control apparatus, print data is generated based on the acquired external content file, and, upon determining that the acquisition process is to be executed by the print apparatus, print data including the reference information file indicating the external content file is generated.

12 Claims, 9 Drawing Sheets

| HEADER PORTION | ~1001 |
| --- | --- |
| REFERENCE DESTINATION URL PORTION | ~1002 |

F I G. 10B

| REFERENCE_DATA=YES | ~1003 |
| --- | --- |
| URL=file:C:¥workspace¥pdf¥bbb.pdf | ~1004 |

| ACQUISITION LOCATION | ~1201 |

FIG. 12B

| DATA_GET_PLACE = HOT_FOLDER | ~1202 |

FIG. 13

PLEASE SELECT LOCATION
FROM WHICH CONTENT DATA IS ACQUIRED

● HOT FOLDER
○ PRINT CONTROLLER
○ PRINT APPARATUS

[ OK ]   [ CANCEL ]

PRINT CONTROL APPARATUS AND CONTROL METHOD THEREFOR

BACKGROUND OF THE INVENTION

1. Field of the Invention

The present invention relates to a technique of printing by a print apparatus via a hot folder.

2. Description of the Related Art

A photographic processing system has conventionally been known as a system which prints a photograph captured by an image capture apparatus such as a digital camera. This photographic processing system inputs image data to be printed first, prints an image using this data, and performs a post-print process, thereby creating a photographic print to be printed. Upon designation of image data to be printed, this photographic processing system performs various print settings, and then stores image data and a setting information file in a folder called a "hot folder".

In a general hot folder, the user (client or operator) copies a file entity (content data) to be printed into the hot folder by copy and paste or drag and drop (Patent Literature 1: Japanese Patent Laid-Open No. 2006-222661).

In another known technique, a job ticket describing an address (for example, a URL) indicating a location is accepted instead of a file entity (content data), and the file entity is separately acquired from a hot folder, thereby instructing to form an image (Patent Literature 2: Japanese Patent Laid-Open No. 2010-257157).

However, in the technique described in the above-mentioned patent literature 1, especially when large-sized print data is submitted to a hot folder, it takes much time to copy a file into it, so the user cannot perform other operations until copy is completed, and the operation slows down.

In the technique described in patent literature 2, when the entity of a file indicated by an address described in a job ticket cannot be accessed from a hot folder due to factors associated with a network, the file entity cannot be acquired from the hot folder.

Also, during running of a hot folder application, even when the printer used is changed to a type having data reference capability so that the printer is ready to acquire data, the printer cannot actually acquire the data.

Moreover, when, for example, the printer has data reference capability and acquires data, it cannot efficiently print if its amount of HDD usage or its amount of jobs exceeds its limit.

SUMMARY OF THE INVENTION

The present invention provides an apparatus and a method which improve the operability of a print process using a hot folder.

According to one aspect of the present invention, there is provided a print control apparatus which causes a print apparatus to print via a hot folder, comprising: a monitoring unit which monitors whether a file is submitted to the hot folder; an identification unit which identifies, upon submitting the file, whether the submitted file is a reference information file indicating an external content file; a determination unit which determines, upon identifying the reference information file by the identification unit, whether an acquisition process of acquiring the external content file indicated by the reference information file is to be executed by the print control apparatus or the print apparatus; and a generation unit which generates, upon determining by the determination unit that the acquisition process is to be executed by the print control apparatus, print data based on the acquired external content file, and generates, upon determining by the determination unit that the acquisition process is to be executed by the print apparatus, print data including the reference information file indicating the external content file.

Further features of the present invention will become apparent from the following description of exemplary embodiments with reference to the attached drawings.

DESCRIPTION OF THE EMBODIMENTS

Modes for carrying out the present invention will be described in detail below with reference to the accompanying drawings. A print system in which a workflow application or an operator causes a print apparatus to print via a hot folder monitored by a hot folder application will be described in the following embodiments.

Figure 1:
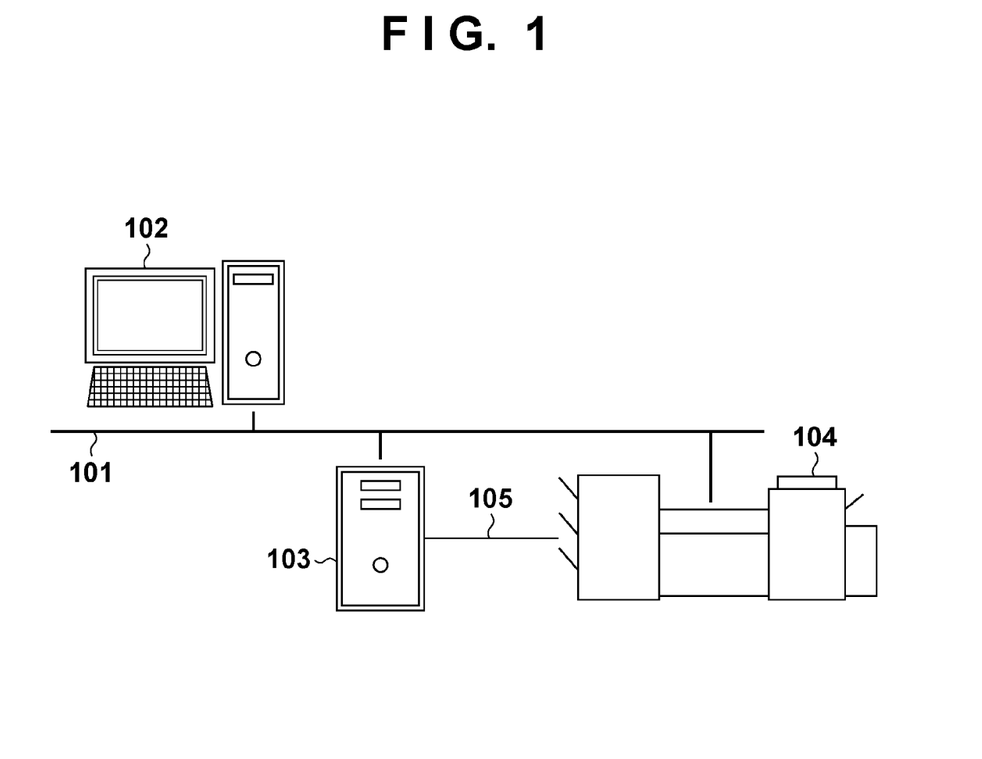
FIG. 1 is a schematic diagram showing the configuration of a print system according to an embodiment of the present invention.

FIG. 1 is a schematic diagram showing the configuration of a print system according to an embodiment of the present invention. In this print system, a client PC 102, a print server 103, and a print apparatus 104 are connected to each other via a network 101. Also, the print server 103 and the print apparatus 104 are connected to each other via an interface cable 105, but may be connected to each other by other connection configurations such as wireless connection or the use of the network 101, as a matter of course.

In response to a print order accepted from the user, the client PC 102 generates commercial material information complying with the user's order and a job ticket corresponding to the commercial material information. After obtaining a complete set of data necessary for printing, the client PC 102 transmits the job ticket and a print job to the print server 103. On the other hand, upon receiving the print job and job ticket transmitted from the client PC 102, the print server 103 interprets the job ticket to issue a print instruction to the print apparatus 104. The print server 103 then performs RIP, and transmits bitmap data obtained by RIP to the print apparatus 104 via the interface cable 105. Alternatively, the print apparatus 104 may perform RIP on behalf of the print server 103.

Note that in an example shown in FIG. 1, the client PC 102 and the print server 103 are connected to each other via the network 101. However, the present invention is not limited to this, and the client PC 102 and the print server 103 may be the same computer.

The hardware configurations of the client PC 102 and print server 103 will be described next with reference to FIGS. 2A and 2B, respectively. The hardware configuration of the client PC 102 will be described first with reference to FIG. 2A.

Figure 2A:
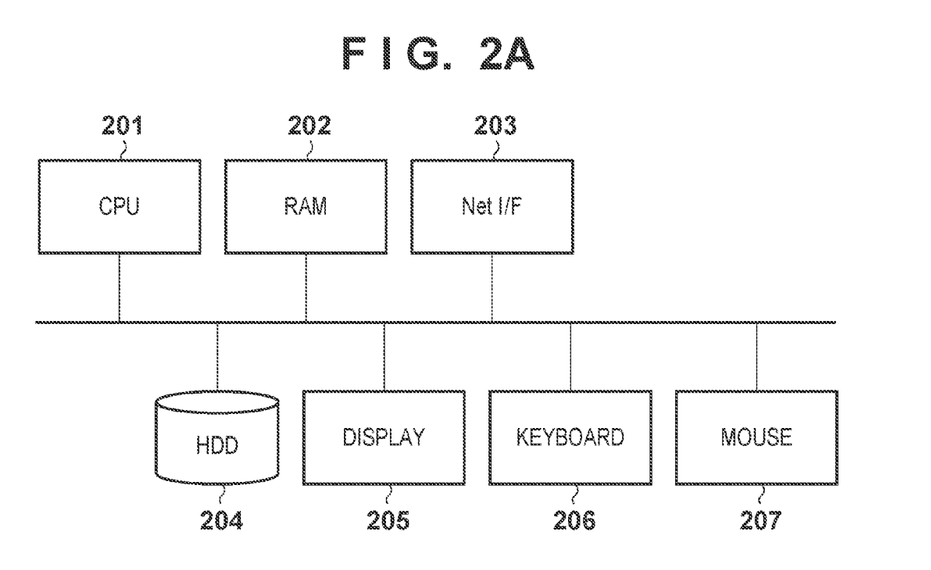
FIG. 2A is a block diagram illustrating an example of the hardware configuration of a client PC.

FIG. 2A is a block diagram illustrating an example of the hardware configuration of the client PC 102. As the hardware of the client PC 102, configurations which use various connection methods and have various buses or interfaces are commonly known, so a hardware configuration introduced herein is merely an example.

A CPU 201 controls the overall client PC 102 in accordance with a control program loaded into a RAM 202. The RAM 202 is an internal storage unit into which a control program for the client PC 102, that is executed by the CPU 201, and data such as a document or an image are loaded. A network interface 203 connects the client PC 102 to a communication network such as the Internet under the control of the CPU 201 to control transmission/reception of, for example, data.

An HDD (Hard Disk Drive) 204 is a mass storage device which stores the control program for the client PC 102 and various data such as various tables. A display 205 is a display device for displaying, for example, the status of the client PC 102. A keyboard 206 is an input device via which the user inputs data to the client PC 102, and a mouse 207 is a pointing device which issues an instruction on the display 205.

Various types of software stored in the HDD 204 are loaded into the RAM 202 as needed, and executed under the control of the CPU 201 using the functions of the operating system, which are loaded into the RAM 202 as well.

The hardware configuration of the print server 103 will be described next with reference to FIG. 2B. FIG. 2B is a block diagram illustrating an example of the hardware configuration of the print server 103.

As in the client PC 102, as the hardware of the print server 103, configurations which use various connection methods and have various buses or interfaces are commonly known, so a hardware configuration introduced herein is merely an example.

Figure 2B:
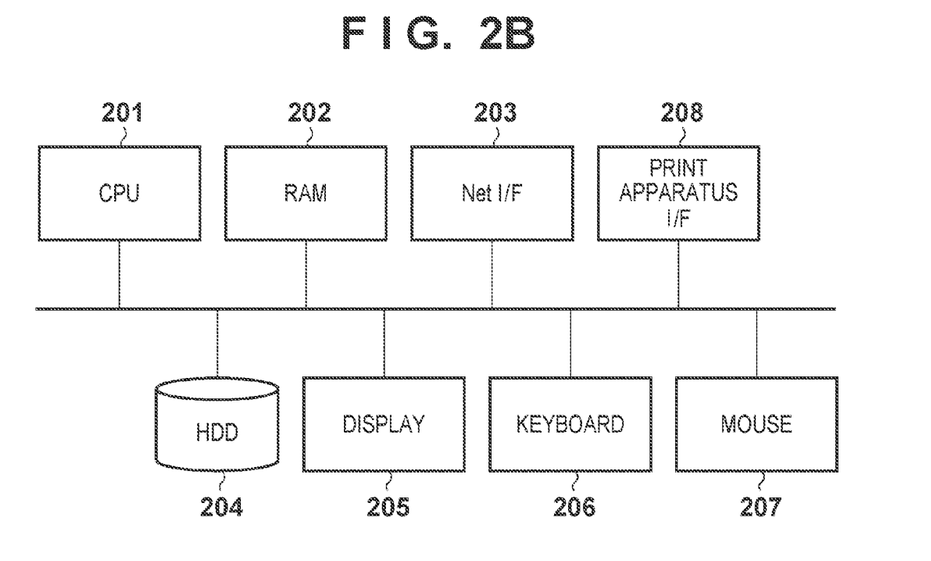
FIG. 2B is a block diagram illustrating an example of the hardware configuration of a print server.

A CPU 201, RAM 202, network interface 203, HDD 204, display 205, keyboard 206, and mouse 207 shown in FIG. 2B have the same functions as those shown in FIG. 2A.

The CPU 201 controls the overall print server 103 in accordance with a control program loaded into the RAM 202. The RAM 202 is an internal storage unit into which a control program for the print server 103, that is executed by the CPU 201, and data such as a document or an image are loaded. The network interface 203 connects the print server 103 to a communication network such as the Internet under the control of the CPU 201 to control transmission/reception of, for example, data.

The HDD 204 is a mass storage device which stores the control program for the print server 103 and various data such as various tables. The display 205 is a display device for displaying, for example, the status of the print server 103. The keyboard 206 is an input device via which the user inputs data to the print server 103, and the mouse 207 is a pointing device which issues an instruction on the display 205.

A print apparatus interface 208 is connected to the print apparatus 104 via the interface cable 105, and used to transmit data having undergone RIP.

Various types of software stored in the HDD 204 are loaded into the RAM 202 as needed, and executed under the control of the CPU 201 using the functions of the operating system, which are loaded into the RAM 202 as well.

Figure 3A:
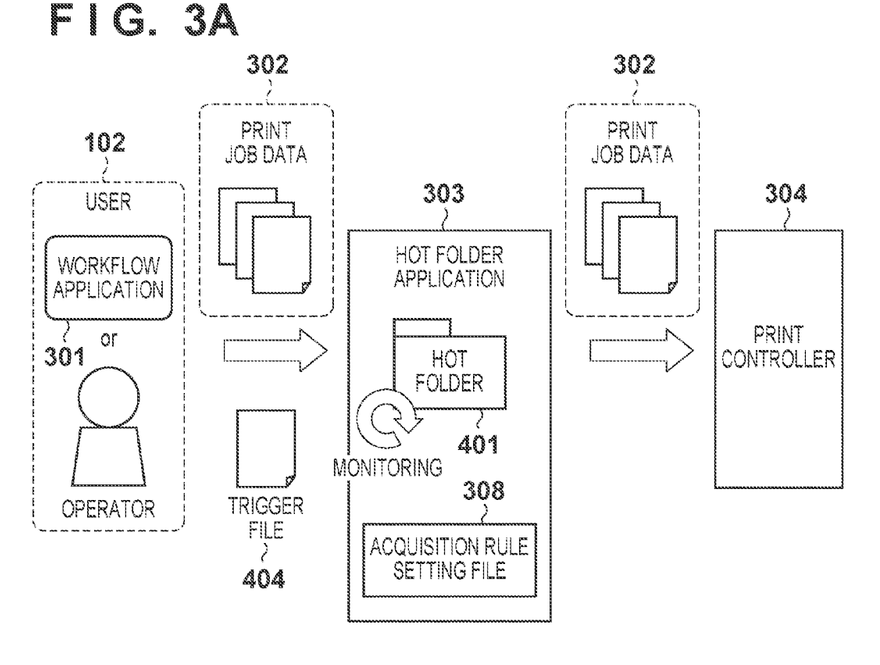
FIG. 3A is a view for explaining a process by a hot folder application.
Figure 3B:
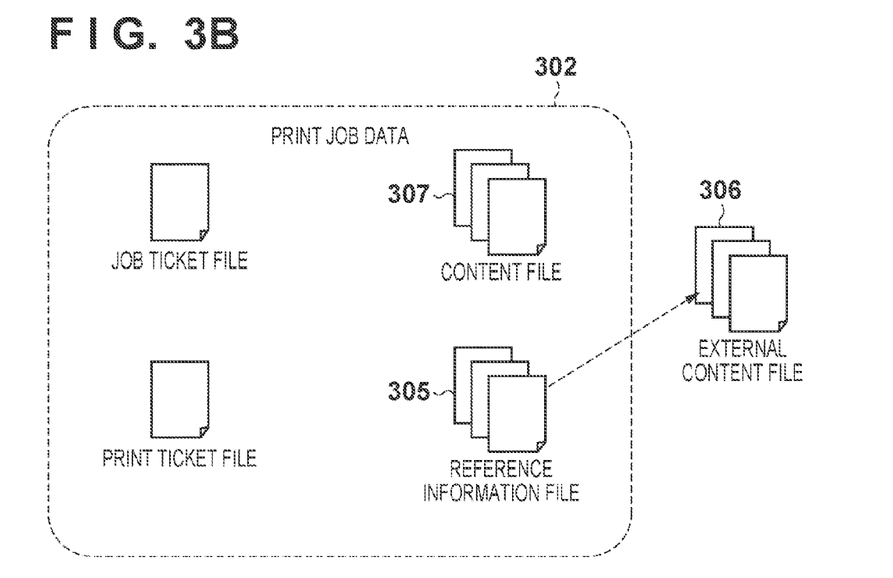
FIG. 3B is a view showing the contents of print job data.

A process executed by a hot folder application in the print system will be described next with reference to FIGS. 3A and 3B. Referring to FIG. 3A, a workflow application 301 is installed on the RAM 202 of the client PC 102, and a hot folder application 303 is installed on the RAM 202 of the print server 103.

Note that the present invention is not limited to the above-mentioned specific installation method, and the workflow application 301 and hot folder application 303 may be installed on the same computer. Also, the operator may execute a process on behalf of the workflow application 301. The workflow application 301 or the operator will be referred to as the "user" hereinafter.

A hot folder 401 is created by the hot folder application 303. Also, the hot folder 401 may be created on the HDD 204 of the same computer as that on which the hot folder application 303 is installed. Moreover, the hot folder 401 may be created on the HDD 204 of another computer which is connected to the print system via the network 101 and on which the workflow application 301 is installed. The present invention is not limited to a single hot folder, and a plurality of hot folders may be created, as a matter of course.

The user generates print job data 302 and a trigger file 404 before printing. Note that in this embodiment, as shown in FIG. 3B, the print job data 302 is formed by the following files:

a content file 307 to be printed, which contains, for example, PDF data or image data;

a reference information file 305 indicating an external content file 306;

a job ticket file in the XML format, which describes job information; and a print ticket file in the XML format that describes print setting information.

In this case, the content file 307 and reference information file 305 may be combined with each other, or one of them may have both functions. Also, the trigger file 404 is an empty file having an arbitrary name and an extension ".trg". However, the present invention is not limited to this empty file. Also, the reference destination at which the external content file 306 is referred to may be described in the job ticket file instead of the reference information file 305. Moreover, print setting information such as the job ticket file and the print ticket file may be associated with the hot folder in advance, thus obviating the need to always include it in the print job data 302. If no print setting information is included in the print job data 302, print setting information described in the job ticket or print ticket associated with the hot folder in advance is used.

Figure 4:
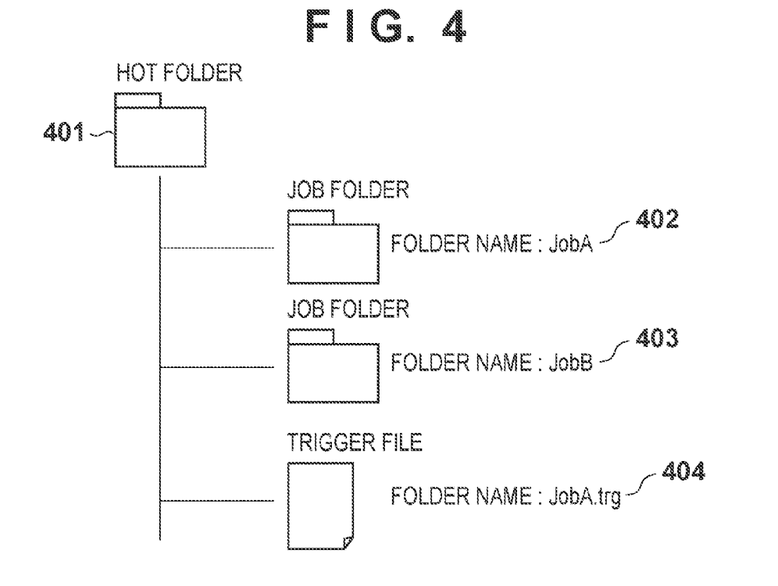
FIG. 4 is a view showing the hierarchical structure of a hot folder.

When the user prints via the hot folder 401, first, he or she creates a job folder 402 having a folder name corresponding to a print job in the hot folder 401, as shown in FIG. 4. The user then copies the print job data 302 into the job folder 402. Note that the user copies the trigger file 404 at the same hierarchical level as the job folder 402 without waiting until copy of the print job data 302 into the job folder 402 is completed.

On the other hand, the hot folder application 303 acquires an event issued by the operating system to monitor a change in the hot folder 401, that is, addition of a file or folder in the hot folder 401. Also, if the hot folder 401 on another computer connected to the print system via the network 101 is to be monitored, the hot folder application 303 cannot acquire any event. In such a case, the hot folder 401 is checked in accordance with a designated monitoring interval to monitor a change in the hot folder 401.

Next, the hot folder application 303 detects the job folder 402 and its corresponding trigger file 404 from the hot folder 401. Upon detection, the job folder 402 containing the print job data 302, and the trigger file 404 are moved to separate folders. An application program interface (API) of a print controller 304 is then invoked to submit the print job data 302 to the print controller 304. Note that the print controller 304 and hot folder application 303 may be running on the same information processing apparatus or separate information processing apparatuses.

If the reference information file 305 is included in the print job data 302, the external content file 306 indicated by the reference information file 305 is submitted to the print controller 304 based on an acquisition rule. After submitting, the trigger file 404 is deleted, and a job submission process by the hot folder application 303 is completed.

At this time, the print controller 304 receives the print job data 302 from the hot folder application 303. The received print job data 302 includes the content file 307 or external content file 306. The print job data 302 also includes the job ticket file and print ticket file, so print settings are acquired from these files. In accordance with these print settings, the print controller 304 converts the content file 307 or external content file 306 into print data in a format that can be printed by the print apparatus 104, and transmits the print data to the print apparatus 104.

Note that the print controller 304 can also transmit the reference information file 305 to the print apparatus 104. In this case, when the hot folder application 303 confirms that the reference information file 305 is submitted to the hot folder, it transmits the print job data 302 including the reference information file 305 to the print controller 304 based on an acquisition rule, although this is merely an example. Thus, the print controller 304 transmits print data including print setting information and a reference information file so that the print apparatus 104 can acquire content data.

An acquisition rule setting file 308 describes a location from which content data is acquired, and will be described later with reference to FIGS. 11 and 12. Note that depending on the acquisition rule, the print controller 304 may acquire content data, and transmit print data based on the content data and print setting information to the print apparatus 104. Especially when the print controller 304 is running on an information processing apparatus different from that on which the hot folder application 303 is running, an effect such as process load balancing can be attained by executing a content data acquisition process using the print controller 304.

Figure 9A:
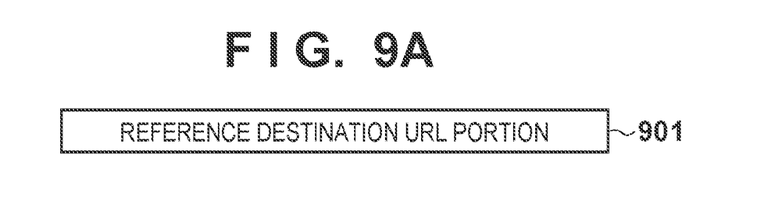
FIG. 9A is a view illustrating an example of the format of the reference information file.

FIG. 9A is a view illustrating an example of the format of the reference information file 305. FIG. 9A shows a reference destination URL portion 901 indicating the external content file 306. In this embodiment, the extension of a submitted file is referred to so that it is identified whether this file is the reference information file 305. If the extension of the submitted file is ".ref", it is determined that this file is the reference information file 305. A detailed process will be described in more detail later with reference to FIG. 5.

Figure 9B:
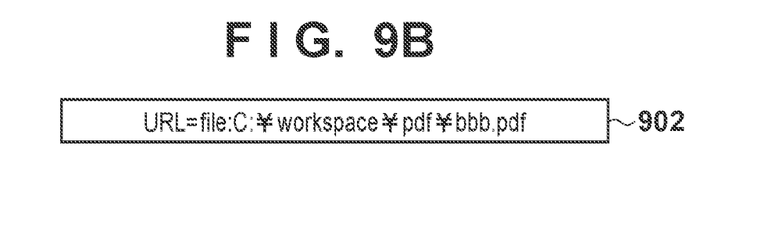
FIG. 9B is a view illustrating a detailed example of an actual reference information file conforming to the format shown in FIG. 9A.

FIG. 9B is a view illustrating a detailed example of an actual reference information file 305 conforming to the format shown in FIG. 9A. FIG. 9B shows an example of the reference destination URL portion 901. "URL=file:C:¥workspace¥pdf¥bbb.pdf" is described on the first line of the reference information file 305, and "file:c:¥workspace¥pdf¥bbb.pdf" of this code indicates the reference destination URL. The external content file 306 is stored at the destination indicated by this URL.

Figure 10A:
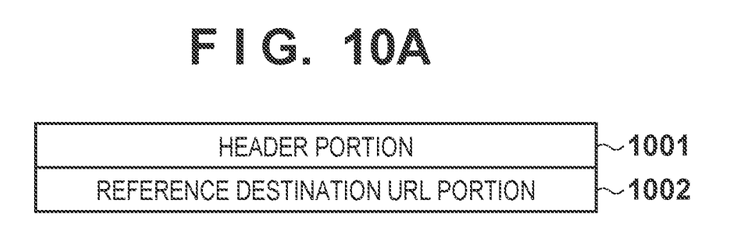
FIG. 10A is a view illustrating another example of the format of the reference information file.

FIG. 10A is a view illustrating another example of the format of the reference information file 305, which is different from that shown in FIG. 9A. In this example, the reference information file 305 includes a header portion 1001 which can be used to identify whether a submitted file is the reference information file 305. The reference information file 305 also includes a reference destination URL portion 1002 similar to the reference destination URL portion 901 shown in FIG. 9A. The reference information file 305 may include data other than the reference destination URL portion 1002. Also, the present invention can also be practiced when the reference information file 305 and the job ticket file are the same as well.

Figure 10B:
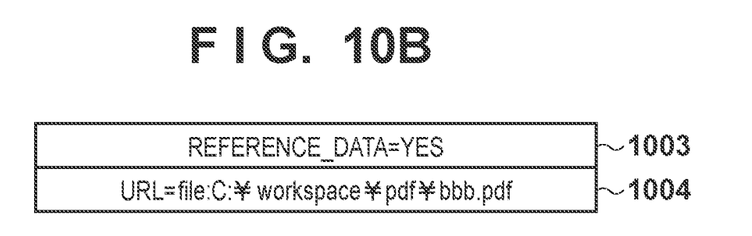
FIG. 10B is a view illustrating a detailed example of an actual reference information file conforming to the format shown in FIG. 10A.

FIG. 10B is a view illustrating a detailed example of an actual reference information file 305 conforming to the format shown in FIG. 10A. FIG. 10B shows an example of the header portion 1003, and "REFERENCE_DATA=YES" is described on the first line of the reference information file 305. In this embodiment, if "REFERENCE_DATA=YES" is described on the first line of a submitted file, it is determined that this file is the reference information file 305. The reference information file 305 also includes a reference destination URL portion 1004 similar to the reference destination URL portion 902 shown in FIG. 9B.

Figure 8:
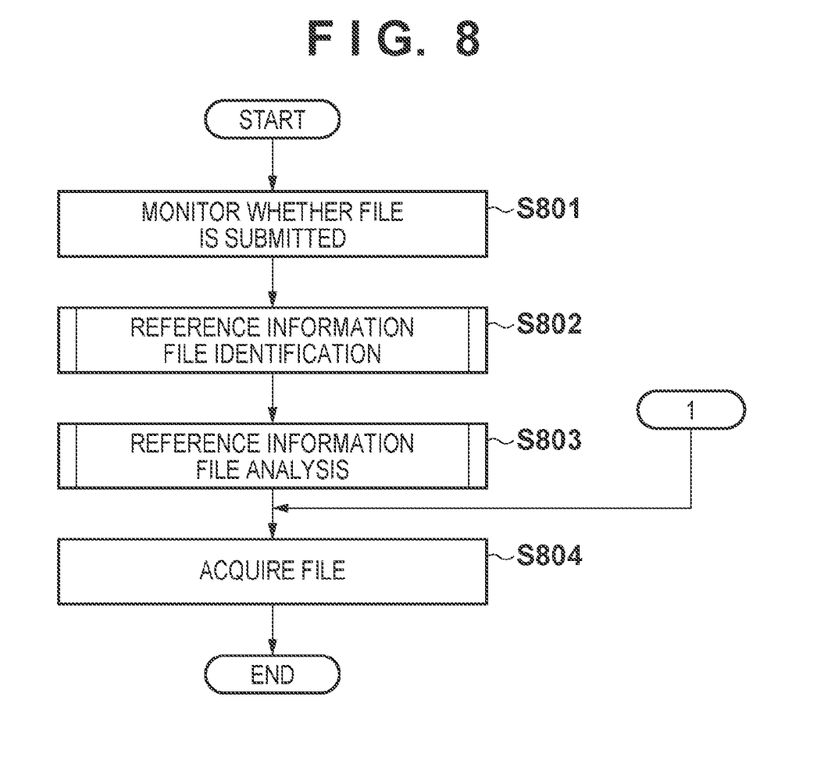
FIG. 8 is a flowchart showing an exemplary process executed by the hot folder application.

FIG. 8 is a flowchart showing an exemplary process executed by the hot folder application 303. First, in step S801, the hot folder application 303 monitors whether the user submits data to be printed to the hot folder 401. "Submission" means herein copying or moving the print job data 302 to the hot folder 401.

As described above, the hot folder application 303 acquires an event issued by the operating system to monitor a change in the hot folder 401. Also, if the hot folder 401 on another computer connected to the print system via the network 101 is to be monitored, the hot folder 401 is checked in accordance with a designated monitoring interval to monitor a change in the hot folder 401.

In step S802, it is identified whether the print job data 302, submission of which is confirmed in step S801, includes the reference information file 305. A detailed process in step S802 will be described in more detail later with reference to FIGS. 5 and 6.

In step S803, the file identified as the reference information file 305 in step S802 is analyzed to acquire a reference destination URL from the reference destination URL portion 901 or 1002. A detailed process in step S803 will be described in more detail later with reference to FIG. 7.

In step S804, the print job data 302, and the external content file 306 indicated by the reference destination URL which is included in the reference destination URL portion 901 or 1002 and acquired in step S803 are submitted to the print controller 304. The print controller 304 then transmits print data to the print apparatus 104, as described above.

Figure 5:
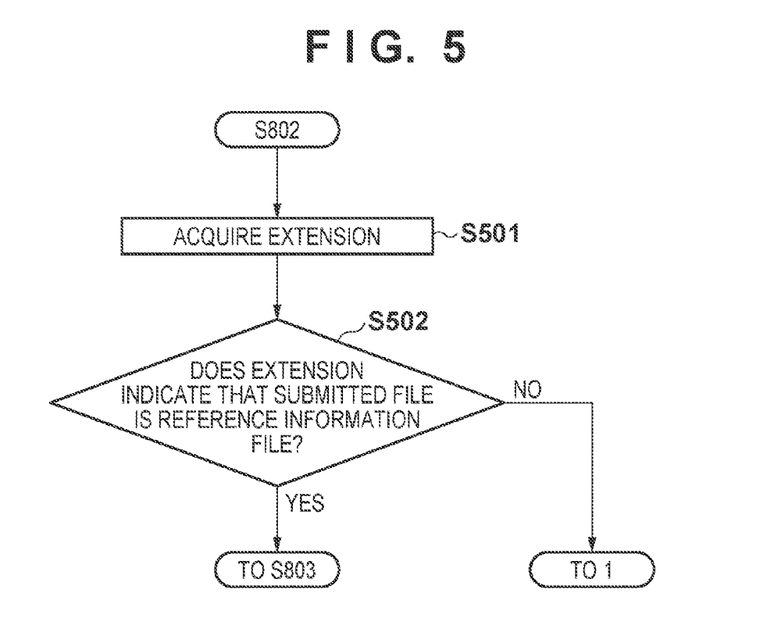
FIG. 5 is a flowchart showing a detailed process in step S802 when a reference information file is used.

FIG. 5 is a flowchart showing a detailed process in step S802 when a reference information file is used. First, in step S501, the extension of the file submitted to the hot folder 401 by the user is acquired.

In step S502, it is confirmed whether the extension acquired in step S501 is ".ref" indicating that the submitted file is the reference information file 305. If YES is determined in step S502, it is determined that the submitted file is the reference information file 305; otherwise, it is determined that the submitted file is a file entity, that is, the content file 307.

Although the extension indicating that the submitted file is the reference information file 305 is assumed to be ".ref" in this embodiment, the present invention can also be practiced when another extension is used as well. Also, it can be freely chosen whether to distinguish between uppercase and lowercase letters of the extension.

If it is determined in step S502 that the submitted file is the reference information file 305, the process advances to step S803. On the other hand, if it is determined in step S502 that the submitted file is a file entity, that is, the content file 307, the process advances to step S804.

Figure 6:
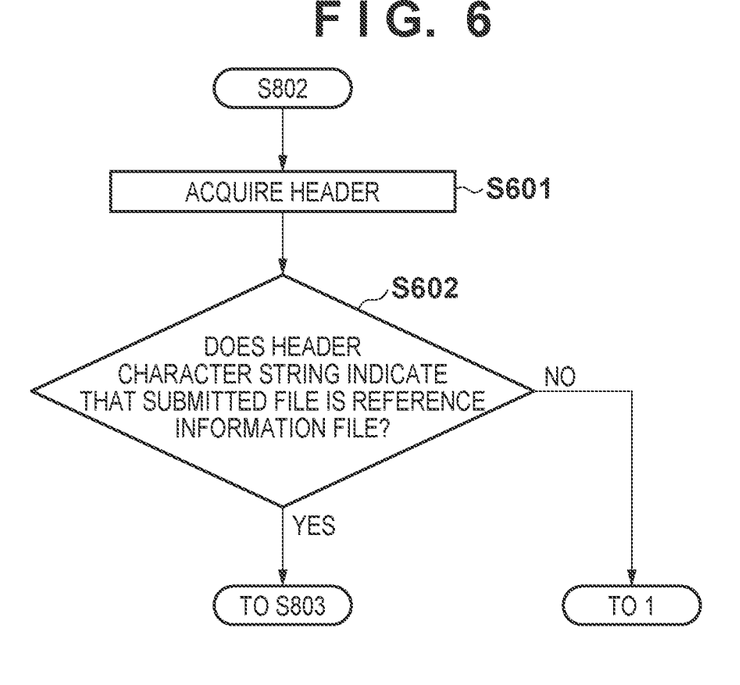
FIG. 6 is a flowchart showing a detailed process in step S802 when another reference information file is used.

FIG. 6 is a flowchart showing a detailed process in step S802 when another reference information file is used. First, in step S601, the header portion 1001 of the file submitted to the hot folder 401 by the user is acquired.

In step S602, it is confirmed whether the header portion 1001 acquired in step S601 coincides with an identifier "REFERENCE_DATA=YES" indicating that the submitted file is the reference information file 305. If YES is determined in step S602, it is determined that the submitted file is the reference information file 305; otherwise, it is determined that the submitted file is a file entity, that is, the content file 307.

Although the header portion 1001 indicating that the submitted file is the reference information file 305 is assumed to be "REFERENCE_DATA=YES", the present invention can also be practiced when another character string or another format is used as well. For example, the use of a GUID makes it possible to reduce identification errors as the submitted file and the reference information file 305 have the same character string on the first line by chance.

Also, the latter method may be used in combination with an identification method which uses an extension, as described above. Moreover, a link file or shortcut provided in advance on the OS on which the hot folder application 303 is running may be used.

If it is determined in step S602 that the submitted file is the reference information file 305, the process advances to step S803. On the other hand, if it is determined that the submitted file is the content file 307, the process advances to step S804.

Figure 7:
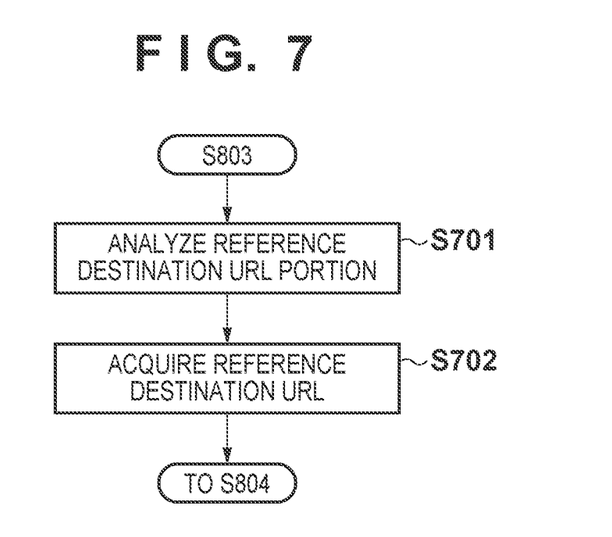
FIG. 7 is a flowchart showing a detailed process in step S803 when a reference information file is used.

FIG. 7 is a flowchart showing a detailed process in step S803 when a reference information file is used. First, in step S701, the reference destination URL is analyzed from the reference destination URL portion 901 or 1002. More specifically, "URL=file:C:¥workspace¥pdf¥bbb.pdf" is divided into "URL=" and "file:C:¥workspace¥pdf¥bbb.pdf". In step S702, "file:C:¥workspace¥pdf¥bbb.pdf" is acquired as a reference destination URL from the analysis result obtained in step S701.

Figure 11:
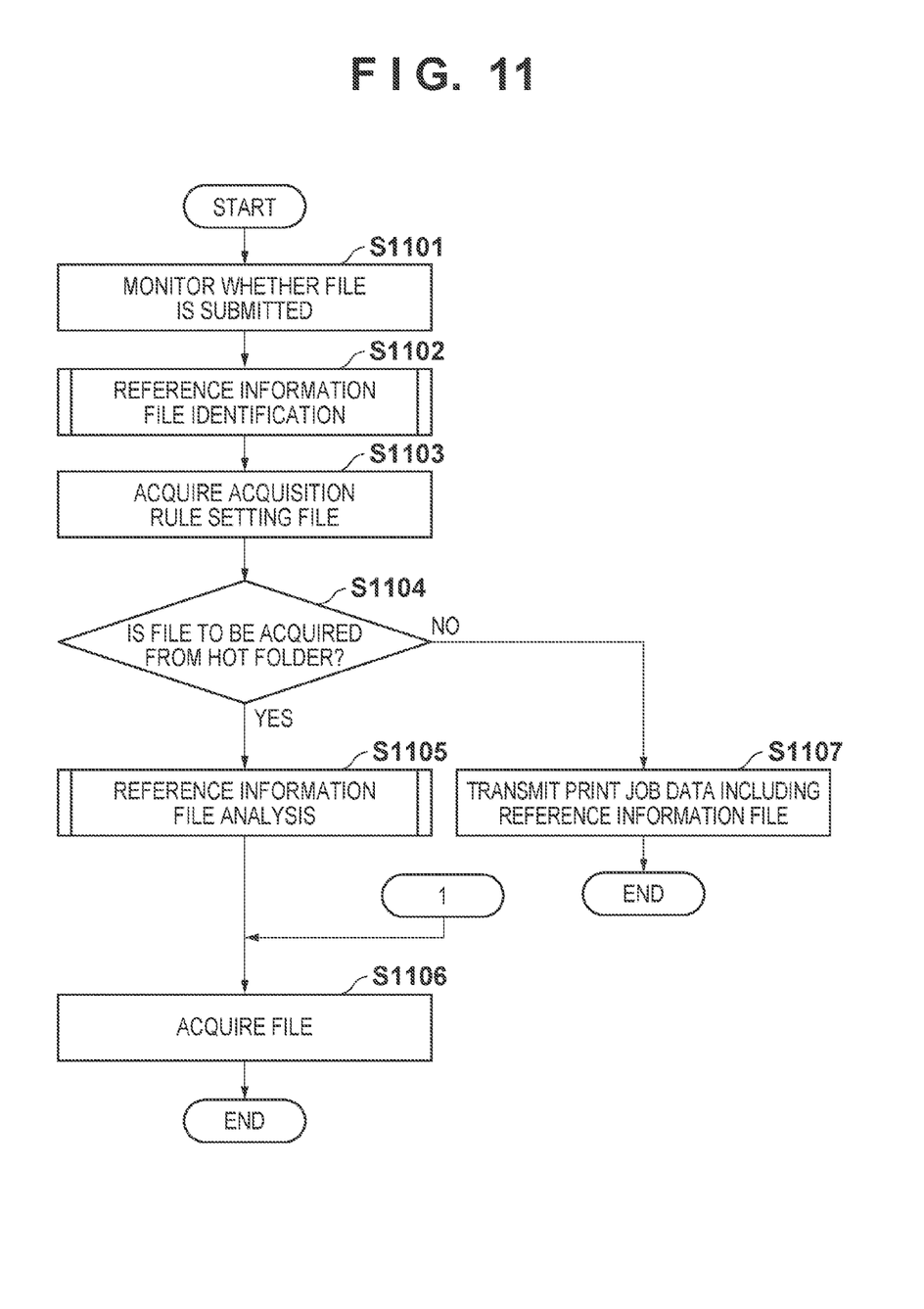
FIG. 11 is a flowchart showing another exemplary process executed by the hot folder application.
Figure 12A:
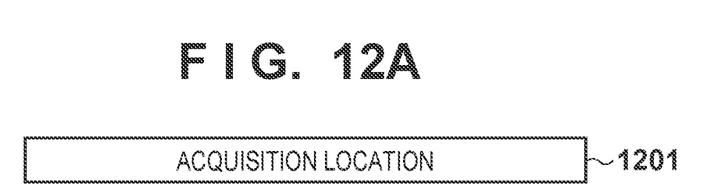
FIG. 12A is a view illustrating an example of the format of an acquisition rule setting file.
Figure 12B:
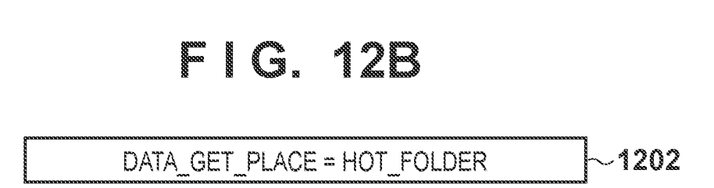
FIG. 12B is a view illustrating a detailed example of an actual acquisition rule setting file conforming to the format shown in FIG. 12A.

FIG. 11 is a flowchart showing an exemplary process which is different from that shown in FIG. 8 and is executed by the hot folder application 303. Processes in steps S1101 and S1102 are the same as in steps S801 and S802, respectively.

Figure 13:
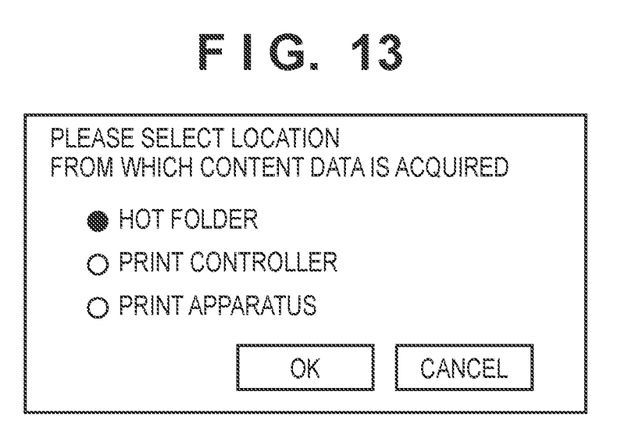
FIG. 13 is a view illustrating an example of a UI for selecting a location from which content data is acquired.

In step S1103, the hot folder application 303 acquires the held acquisition rule setting file 308. The present invention can be practiced regardless of whether the acquisition rule setting file 308 is included in the print job data 302 or held for each hot folder. FIG. 12A is a view illustrating an example of the format of the acquisition rule setting file. FIG. 12B is a view illustrating a detailed example of an actual acquisition rule setting file conforming to the format shown in FIG. 12A. "DATA_GET_PLACE=HOT_FOLDER" is described on the first line of the acquisition rule setting file, and "HOT_FOLDER" of this code indicates a location from which the external content file 306 is acquired. Since "HOT_FOLDER" indicates a hot folder, this rule stipulates that the hot folder application 303 acquires content data. Instead, if, for example, "PRINT_SDK" is described on the first line of the acquisition rule setting file, the print controller 304 acquires content data; or if "PRINTER" is described on the first line of the acquisition rule setting file, the print apparatus 104 acquires content data. That is, the hot folder application 303 determines that the print controller 304 acquires the content data if "HOT_FOLDER" or "PRINT_SDK" is set as "DATA_GET_PLACE". On the other hand, the hot folder application 303 determines that the print apparatus 104 acquires the content data if "PRINTER" is set as "DATA_GET_PLACE". Note that an acquisition rule setting file is generated in accordance with a user's instruction. For example, the hot folder application 303 displays a selection screen, as shown in FIG. 13, used to select a location from which content data is acquired. In this case, if a hot folder is selected, an acquisition rule setting file, as shown in FIG. 12B, is generated.

In step S1104, the hot folder application 303 determines whether the location from which content data is acquired is "HOT_FOLDER". If YES is determined in step S1104, the process advances to steps S1105 and S1106. Processes in steps S1105 and S1106 are the same as in steps S803 and S804, respectively. If NO is determined in step S1104, the hot folder application 303 transmits print job data including the reference information file 305 to the print controller 304 in step S1107. Note that the print job data includes a location from which content data is acquired and which is based on the acquisition rule setting file.

In step S1107, in a process subsequent to that which uses the hot folder, the print job data including the reference information file 305 is received, and the print controller 304 or print apparatus 104 acquires content data based on the reference information file 305. Note that the present invention can also be practiced when the contents of the reference information file 305 are included in the job ticket as well. Although an acquisition rule setting file is generated in accordance with a user's instruction input using the selection screen shown in FIG. 13 in the above-mentioned embodiment, it may automatically be generated. For example, if the hot folder application 303 recognizes unprocessed print job data, the number of which is equal to or larger than a threshold designated by the user, it generates an acquisition rule setting file so that the print apparatus 104 executes a process of acquiring the content data of subsequent print job data including reference information files. On the other hand, if the hot folder application 303 determines that unprocessed print job data, the number of which is equal to or larger than a threshold designated by the user, remain in the print apparatus 104, it generates an acquisition rule setting file so that the hot folder application 303 itself executes a process of acquiring the content data of subsequent print job data including reference information files.

Again, if the hot folder application 303 cannot access a reference destination described in a reference information file, it generates an acquisition setting file so that the print apparatus 104 executes a process of acquiring the content data of print job data including this reference information file.

Also, the hot folder application 303 may acquire the capability of the print apparatus 104 to determine the acquisition destination of content data based on whether the apparatus at this acquisition destination has a function of acquiring content data. More specifically, if the print apparatus 104 has a function of acquiring content data, the hot folder application 303 generates an acquisition rule setting file indicating that the print apparatus 104 acquires content data. On the other hand, if the print apparatus 104 cannot acquire any content data, the hot folder application 303 generates an acquisition rule setting file so that the hot folder application 303 itself acquires content data. Again, based on the amount of jobs and the HDD free space of the print apparatus 104, it may selectively be determined whether the hot folder application 303 acquires content data or the print apparatus 104 acquires content data. More specifically, if the free space of the print apparatus 104 is smaller than a predetermined capacity, the hot folder application 303 generates an acquisition rule setting file so that the hot folder application 303 itself acquires content data. In other words, the hot folder application 303 may generate an acquisition rule setting file so that an idle apparatus executes a content data acquisition process as much as possible, in accordance with the statuses of both the print apparatus 104 and hot folder application 303. At this time, if the print controller 304 is running on an information processing apparatus different from that on which the hot folder application 303 is running, the print controller 304 may be added as a candidate for executing an acquisition process as well.

According to this embodiment, a reference information file which has a small size and contains file reference destination information is used as an input to a hot folder, thereby making it possible to shorten the time taken to copy the file into the hot folder. It is also possible to improve the operability of the hot folder application.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-288555 filed Dec. 24, 2010 and 2011-231100 filed Oct. 20, 2011, which are hereby incorporated by reference herein in their entirety.

What is claimed is:

1. A print control apparatus which causes a print apparatus to print via a hot folder, comprising:
   a monitoring unit which monitors whether a file is submitted to the hot folder;
   an identification unit which identifies, upon submitting the file, whether the submitted file is a reference information file indicating an external content file;
   a determination unit which determines, upon identifying the reference information file by said identification unit, whether an acquisition process of acquiring the external content file indicated by the reference information file is to be executed by the print control apparatus or the print apparatus; and
   a generation unit which generates, upon determining by said determination unit that the acquisition process is to be executed by the print control apparatus, print data based on the acquired external content file, and generates, upon determining by said determination unit that the acquisition process is to be executed by the print apparatus, print data including the reference information file indicating the external content file.

2. The print control apparatus according to claim 1, wherein said determination unit determines based on an acquisition rule whether the acquisition process is to be executed by the print control apparatus or the print apparatus.

3. The print control apparatus according to claim 2, wherein the acquisition rule is generated in accordance with an instruction input by a user.

4. The print control apparatus according to claim 2, wherein the acquisition rule is generated based on statuses of the print control apparatus and the print apparatus.

5. A control method for a print control apparatus which causes a print apparatus to print via a hot folder, comprising:
   monitoring whether a file is submitted to the hot folder;
   identifying, upon submitting the file, whether the submitted file is a reference information file indicating an external content file;
   determining, upon identifying the reference information file, whether an acquisition process of acquiring the external content file indicated by the reference information file is to be executed by the print control apparatus or the print apparatus; and
   generating, upon determining that the acquisition process is to be executed by the print control apparatus, print data based on the acquired external content file, and generating, upon determining that the acquisition process is to be executed by the print apparatus, print data including the reference information file indicating the external content file.

6. The method according to claim 5, wherein in the determining step, it is determined based on an acquisition rule whether the acquisition process is to be executed by the print control apparatus or the print apparatus.

7. The method according to claim 6, wherein the acquisition rule is generated in accordance with an instruction input by a user.

8. The method according to claim 6, wherein the acquisition rule is generated based on statuses of the print control apparatus and the print apparatus.

9. A non-transitory computer-readable recording medium recording a program for causing a computer to execute a control method for a print control apparatus which causes a print apparatus to print via a hot folder, the method comprising:
   monitoring whether a file is submitted to the hot folder;
   identifying, upon submitting the file, whether the submitted file is a reference information file indicating an external content file;

determining, upon identifying the reference information file, whether an acquisition process of acquiring the external content file indicated by the reference information file is to be executed by the print control apparatus or the print apparatus; and generating, upon determining that the acquisition process is to be executed by the print control apparatus, print data based on the acquired external content file, and generating, upon determining that the acquisition process is to be executed by the print apparatus, print data including the reference information file indicating the external content file.

10. The non-transitory computer-readable recording medium according to claim 9, wherein in the determining step, it is determined based on an acquisition rule whether the acquisition process is to be executed by the print control apparatus or the print apparatus.

11. The non-transitory computer-readable recording medium according to claim 10, wherein the acquisition rule is generated in accordance with an instruction input by a user.

12. The non-transitory computer-readable recording medium according to claim 10, wherein the acquisition rule is generated based on statuses of the print control apparatus and the print apparatus.

* * * * *